United States Patent [19]

Hiemann et al.

[11] 4,272,990
[45] Jun. 16, 1981

[54] DEVICE FOR THE MEASUREMENT OF ACOUSTIC REVERBERATION TIME AND METHOD

[75] Inventors: Klaus Hiemann, Isernhagen; Jost-Michael Haase, Burgwedel, both of Fed. Rep. of Germany

[73] Assignee: Polygram GmbH, Hanover, Fed. Rep. of Germany

[21] Appl. No.: 60,375

[22] Filed: Jul. 25, 1979

[30] Foreign Application Priority Data

Jul. 26, 1978 [DE] Fed. Rep. of Germany ....... 2832791

[51] Int. Cl.³ .............................................. G01H 7/00
[52] U.S. Cl. ..................................................... 73/586
[58] Field of Search ................................. 73/571, 586

[56] References Cited

U.S. PATENT DOCUMENTS 3,827,288  8/1974  Fletcher et al. .................... 73/586 X
3,878,382  4/1975  Bjor et al. ........................... 73/586 X

FOREIGN PATENT DOCUMENTS 1497395  1/1978  United Kingdom ..................... 73/586

Primary Examiner—Charles A. Ruehl
Attorney, Agent, or Firm—Hill, Van Santen, Steadman, Chiara & Simpson

[57] ABSTRACT

A device for measuring acoustic reverberation time incorporates a transmission unit and a reception unit combined together into one assembly. Both units share a single series of filters, one of which filters is inserted into a signal path for the transmission unit and for the reception unit. The device serves to measure accurately the acoustic reverberation time of acoustic spaces such as recording rooms, sound studios and the like.

12 Claims, 1 Drawing Figure

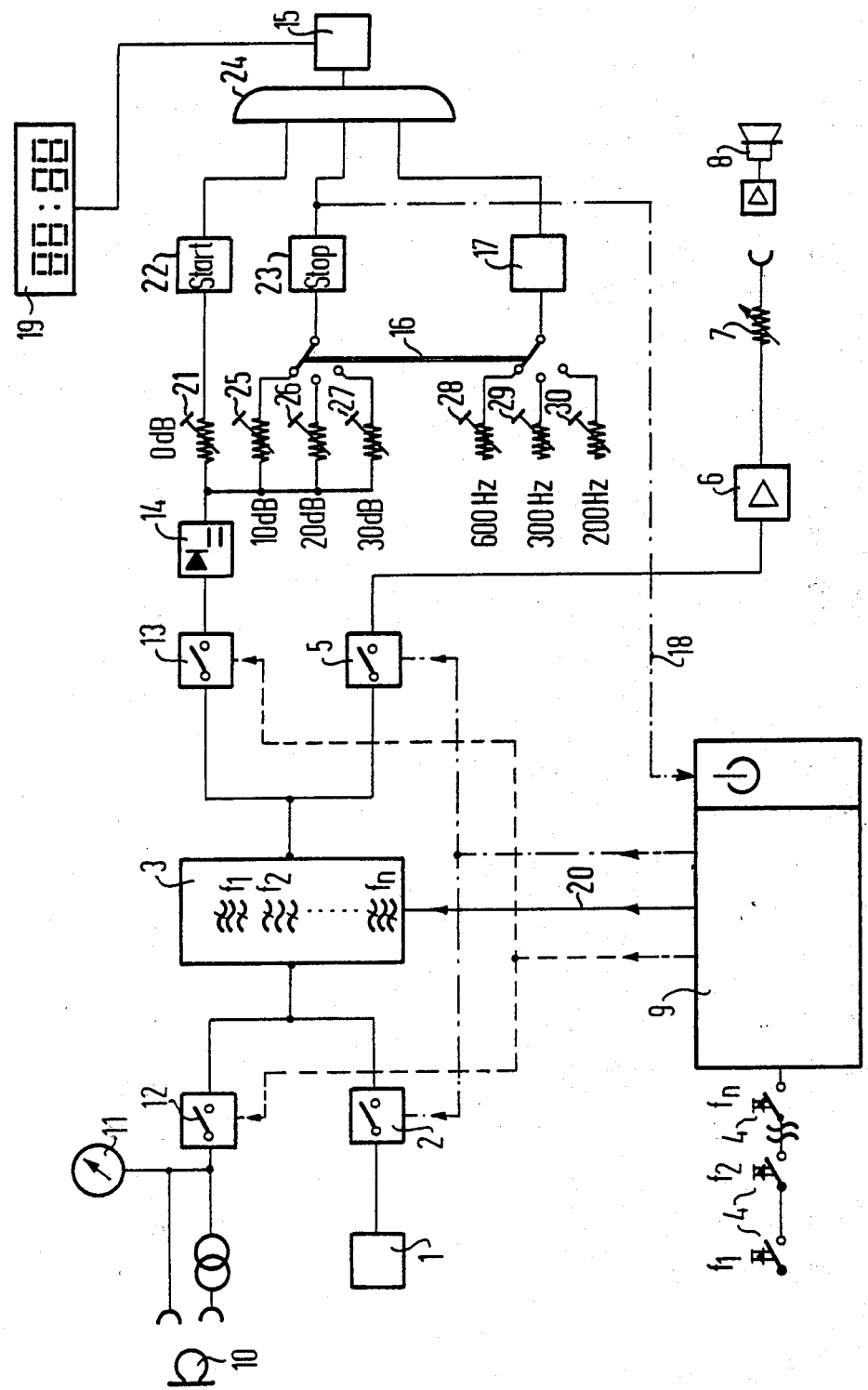

DEVICE FOR THE MEASUREMENT OF ACOUSTIC REVERBERATION TIME AND METHOD

BACKGROUND

1. Field of the Invention

The present invention relates to a device for the measurement of acoustic reverberation time, and more particularly to a device employing a narrow band audible signal which can be selected by means of individual band-pass filters.

2. The Prior Art

The acoustic properties of the recording space are very important in sound recording, and particularly important is the reverberation time which is a complicated function of many factors including the volume of the recording space, and the sound absorption of the materials defining the space. The reverberation time is the time interval that extends from the time of cessation of a sound source, until the time at which the acoustic pressure resulting from such sound source has decreased to one-thousandth part of its original value, i.e., the acoustic pressure level decreases by 60 dB. It is customary to use a narrow band noise signal with a bandwidth of approximately one-third of an octave. It is known to generate such a signal by means of a noise generator, and pass the noise generator signal to a loudspeaker through a band-pass filter having a pass band of one-third octave. When the signal is turned off, the signal after cessation is recorded by way of a microphone, and again filters through a band-pass filter. It is necessary that the filter for the transmitting function and the filter for the receiving function be tuned to the same mean frequency in order to obtain significant results.

BRIEF DESCRIPTION OF THE INVENTION

It is a principal object of the present invention to provide a device for the measurement of acoustic reverberation time which is very simple in construction, but capable of obtaining highly precise results.

It is a further object of the present invention to provide a device for measuring acoustic reverberation time in which the same filter is used in the transmission unit and the reception unit so that precisely the same pass band is transmitted and received.

A further object of the present invention is to provide a device in which the transmission unit and the reception unit are combined together in a common assembly, and is simple enough in construction to make a small, lightweight portable measuring device possible.

In accordance with the present invention, the transmission unit and reception unit are assembled together, and employ a single series of band-pass filters, each having a pass band of approximately one-third of an octave. Each of the filters can be alternately inserted into the signal path of the transmission unit and the signal path of the reception unit, by means of selectively operated switches.

These and other objects and advantages of the present invention will become manifest by an examination of the following description and the accompanying drawing.

BRIEF DESCRIPTION OF THE DRAWING

Reference will now be made to the accompanying drawing, which illustrates in functional block diagram form, an illustrative embodiment of the present invention.

DESCRIPTION OF THE PREFERRED EMBODIMENT

Referring now to the drawing, a noise signal generator 1 is provided, which is adapted to produce random noise signals within the band extending from 20 Hz. through 20 kHz. The output of the noise generator 1 is connected through a switch 2 to the common input of a series of filters 3, each of which has a pass band of approximately one-third octave. Accordingly, there are thirty filters for covering the entire band from 20 Hz. through 20 kHz.

Only one of the thirty filters 3 is activated at any given time, that one filter being selected by a control line or lines 20 from an automatic program control unit 9. The output of the selected filter is connected through a switch to an amplifier 6, and the output of the amplifier 6 is connected through a level control unit 7 to a loudspeaker 8. The loudspeaker converts the electrical signal into acoustic energy, which energy is used to excite the acoustic space being measured.

It will be clear to those skilled in the art, that a variety of techniques may be used for selecting a single filter for activation, including the use of selectively operable gates at the inputs and outputs of each filter, or the selective application of power to an active filter arrangement. As these and other selecting techniques which may be employed are familiar to those skilled in the art, they will not be described in detail herein.

The control unit 9 has a plurality of key-operated switches 4 which are manually operable in order to select the filter unit which is to be used. The key switches 4 are shown only diagrammatically, with some of their connections omitted, because the manner of connecting key switches of a keyboard or the like to select a given one or a combination of control lines 20 for activation of a single filter unit is well understood to those skilled in the art.

After the loudspeaker 8 has been operated for about 10 seconds, the program control unit 9 automatically changes over from the transmission mode to the reception mode. This is accomplished by opening the switches 2 and 5, decoupling the noise generator 1 and the loudspeaker 8 from the filters 3. Simultaneously, switches 12 and 13 are closed.

A microphone 10 picks up the acoustic energy reverberating in the acoustic space being measured, and connects it through the switch 12 to the filter which is selected by the control line or lines 20. The microphone input is also connected to a level indicator 11, which may be a rectifying type. The signal passed through the switch and one of the filters 3, however, is a non-rectified signal. The output of the selected filter is connected through the switch 13 to a rectifier 14 which is preferably a full-wave rectifier. The DC output of the rectifier 14 is connected through an adjustable attenuator 21 to the input of a start control unit 22. The start control unit 22 is a threshold responsive device, and is adapted to produce an output signal when its input signal falls below a given threshold. The adjustable attenuator 21 is adjusted so that the start device 22 is initiated when the acoustic signal derived from the microphone 10 falls by about 5 dB. At this moment, an output signal is produced by the start unit 22 which enables a gate 24. Thereafter, the gate 24 passes counting pulses to a counter 15, until the sound level in the acoustic space being tested falls below a predetermined level, after which the counter 15 is stopped. The content of the counter is then displayed in a display unit 19, from which reverberation time can be measured directly.

The output of the rectifier 14 is connected to the common inputs of a series of adjustable attenuators 25, 26 and 27, the output of one of which is selected by means of a switch 16 for connection to a stop control unit 23. The stop control unit 23 is a threshold sensitive device, which produces an output signal when its input signal drops below a given threshold. The adjustable attenuators 25-27 are adjusted so that the stop unit 23 is operated when the signal derived from the microphone 10 drops by 10 dB, 20 dB, and 30 dB, respectively. When the stop unit 23 is operated, the gate 24 is disabled, so that the counter 15 ceases counting.

A clock pulse generator 17 has an output connected through the gate 24 for supplying the pulses which are counted by the counter 15, and the frequency of operation of the clock pulse generator 17 is controlled in cooperation with the switch 16. The second pole of the switch 16 selects one of three adjustable controls 28-30, which are connected between a source of reference potential (not shown) and a control input of a clock pulse generator 17. When the switch 16 is in its upper position as shown, the control 28 is selected and the frequency of the clock pulse generator is 600 Hz. The generator's frequency is 300 Hz. and 200 Hz. when the controls 29 and 30 are selected, respectively.

The clock frequency selecting pole of the switch 16 operates in conjunction with the pole which selects the level of operation of the stop unit 23, so that the 600 Hz. clock signal is employed when the stop unit 23 is activated at a 10 dB level; a 300 Hz. clock signal is employed when the stop unit 23 is activated at the 20 dB level; and the 200 Hz. frequency is employed when the stop unit 23 is activated at the 30 dB level. This allows the display unit 19 to automatically display the reverberation time converted to 60 dB, even though the counter 15 is counted only during a period in which the reverberation sound has fallen only 10, 20 and 30 dB, in accordance with the position of said switch 16.

The output of the stop unit 23 is also employed to reset the control unit 9 preparatory to a further operation, which is indicated by the dash line 18. This causes the control unit 9 to open switches 12 and 13, at which time all four control switches 2, 5, 12 and 13 are open. This allows a succeeding operation to be initiated by closing switches 2 and 5, with one of the filters 3 selected by the line or lines 20 in accordance with the key switch 4 which is operated. Since the same filter 3 is employed by the transmission unit and the reception unit, the pass band of the transmitting and reception units are identical, and no error is introduced as the result of the use of filters which are not perfectly matched. The operation of the control unit 9 in changing over from the transmitting mode to the receiving mode, at which switches 2 and 5 are open and switches 12 and 13 are closed, preferably occurs automatically after the switches 2 and 5 have been closed for about 10 seconds, this being an adequate time to excite the acoustic space for measurement of the reverberation time.

The specific details of the control unit 9 need not be described, since apparatus for carrying out the functions of the control unit 9 is well-known to those skilled in the art, and a variety of techniques may be used in its construction.

It is apparent from the foregoing that the device of the present invention offers an extremely simple and compact apparatus which is capable of measuring reverberation times with extreme accuracy. Since the identical band-pass filter is used during the transmitting and reception modes, no error is introduced as the result of mismatched filters. The reverberation time is displayed, converted to 60 dB, without requiring a microphone having exceptionally high sensitivity, and without requiring special measures for excluding all other sound sources from the acoustic space during the period of measurement.

The level control unit 7 may be used to establish any given sound level within the acoustic space, which level is indicated by the meter 11. When a standard intensity is employed, the controls 21 and 25-27 may be preset, facilitating the taking of measurements. Any of the three levels may be selected by means of the switch 16, depending on the parameters of the acoustic space, and ambient conditions. It is apparent that the counter 15 is reset (by means not shown) between successive measurements, so that the counting always starts from zero.

It will be apparent that various modifications and additions may be made to the apparatus of the present invention by those skilled in the art without departing from the essential features of novelty thereof, which are intended to be defined and secured by the appended claims.

What is claimed is:

1. In apparatus for measuring the acoustic reverberation time of an acoustic space, having means for generating a sound frequency signal, a loudspeaker for exciting said acoustic space, a transducer for responding to acoustic energy within said space, and a time measuring device for measuring said acoustic reverberation time, the combination comprising; a plurality of band-pass filters each having a pass band of approximately one-third octave, means for connecting the input of a selected one of said filters to said sound generator and the output of said selected filter to said loudspeaker, and means for alternately connecting the input of said filter to said transducer and the output of said filter to said reverberation time measuring device.

2. Apparatus according to claim 1, said means including control elements for disconnecting said selected filter from said sound source and from said loudspeaker, and for connecting said filter with said transducer and with said mesuring device, after the connections to said sound source and said loudspeaker have been established for a predetermined time interval.

3. Apparatus according to claim 1, including a plurality of key-operated switches for selecting one of said filters.

4. Apparatus according to claim 1, wherein each of said filters has a different, nonoverlapping, pass band within the audible frequency range.

5. Apparatus according to claim 1, wherein said measuring device comprises a counter, a source of clock pulses, and means for enabling said counter to count said clock pulses during the reverberation period following disconnection of said filter from said sound source and said loudspeaker.

6. Apparatus according to claim 5, wherein said last-named means incorporates means for starting said counter when the amplitude of the reverberation signal has fallen slightly from its maximum value, and stopping said counter when the amplitude of said reverberation has fallen to a second predetermined value.

7. Apparatus according to claim 6, including means for selecting said predetermined second value, and means for controlling the pulse repetition rate of said clock pulse generator in accordance with the selection of said second predetermined level.

8. The method of measuring the acoustic reverberation time of an acoustic space comprising the steps of:
selecting one of a plurality of band-pass filters having pass bands within the sound frequency range,
connecting the sound frequency source to the input of said selected filter,
connecting the output of said selected filter to a loudspeaker for exciting said acoustic space,
disconnecting said selected filter from said sound source and from said loudspeaker after a time interval, and
reconnecting the input of said selected filter to a transducer responsive to acoustic energy within said acoustic space and reconnecting the output of said selected filter to a time measuring device whereby the time measuring device measures the reverberation time of a signal detected by said transducer and passed through the same band-pass filter used to select the acoustic exciting signal.

9. The method according to claim 8, including the step of adjusting the amplitude of sound produced by said loudspeaker, and metering the output of said transducer to set said output at a first predetermined level, and measuring the time interval required for said output to fall to a final predetermined level.

10. The method according to claim 9, including the step of initiating said time measurement when said output has fallen from said first predetermined level to a second predetermined level intermediate said first and final levels.

11. The method according to claim 9, including the steps of manually selecting said final level.

12. The method according to claim 11, wherein said measuring comprises selecting a pulse repetition rate in accordance with the selected final level, and counting the number of cycles of said pulse repetition rate during said time interval, whereby said counted number indicates the time required for said output to fall to a predetermined fraction of said first level.

* * * * *